Dec. 3, 1963  N. A. MORAS ETAL  3,112,573
BLADE FOR EARTH-WORKING TRACTOR
Filed July 26, 1961

INVENTORS:
Nello A. Moras
Robert E. Groff

Max E. Shirk
Attorney

3,112,573
BLADE FOR EARTH-WORKING TRACTOR
Nello A. Moras, 101 W. Canada Ave., and Robert E. Groff, both of San Clemente, Calif.; said Groff assignor to said Moras
Filed July 26, 1961, Ser. No. 126,913
1 Claim. (Cl. 37—145)

This invention relates to attachments for earth-working tractors and more particularly to a blade which may be attached to the conventional back-ripper of a tractor in such a manner that the blade may be employed for bulldozing, grading, leveling and backfilling.

Certain earth-moving tractors are equipped with a front end bucket-type loader and a set of ripper teeth on the rear of the tractor. The bucket loader is used for moving dirt from one pile to another. The ripper teeth are employed for loosening packed soil. When it is necessary to move soil which has been loosened by the ripper teeth, the bucket loader cannot be used therefor until the soil has been scraped into a pile. This requires the use of another tractor which is equipped with a suitable blade for moving the loosened soil into a pile.

Furthermore, a separate tractor with a blade is needed whenever it is desired to bulldoze, level or grade the surface of the ground because the bucket loader cannot perform these functions.

With the device of my inventions, however, it is possible to combine all of these operations into a comprehensive unit employing but a single tractor.

In view of the foregoing factors and conditions characteristic of earth-moving tractors, it is the primary object of the present invention to provide a new and improved attachment for earth-moving tractors not subject to the disadvantages enumerated above and being efficient, and readily manufactured.

Another object of the invention is to provide the back-ripper of a tractor with a blade which may be used for backfilling, grading and buildozing work.

Another object of the invention is to provide a blade of the type described which may be swung up out of the way when the back-ripper is being used without the blade.

These and other more specific objects will appear upon reading the following specification and claims and upon considering in connection therewith the attached drawings to which they relate.

Referring now to the drawings in which preferred embodiments of the invention are illustrated:

Figure 1:
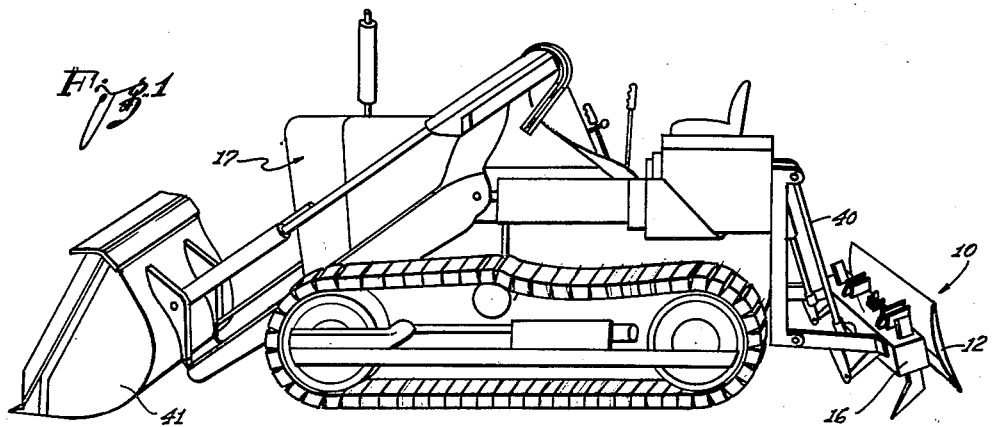
FIGURE 1 is a perspective view of a tractor employing a blade of the invention.
Figure 2:
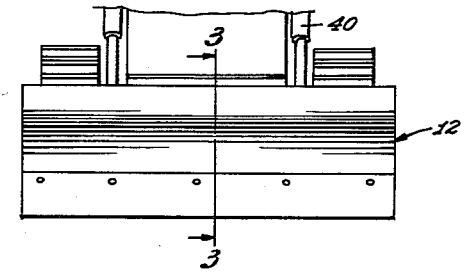
FIGURE 2 is a rear view of a blade of the invention.
Figure 3:
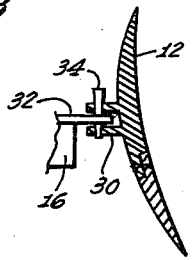
FIGURE 3 is a cross sectional view taken along line 3—3 of FIGURE 2.
Figure 4:
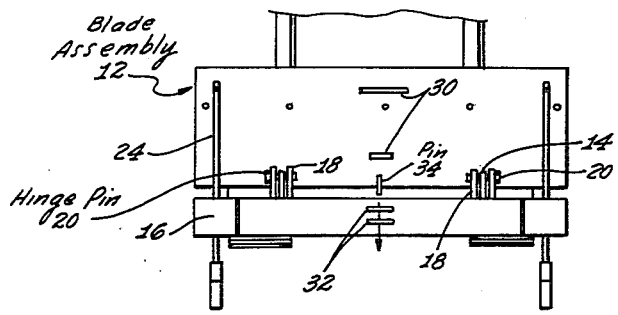
FIGURE 4 is rear view showing the blade of the invention in its "up" or traveling position.

Referring again to the drawings, the back-ripper attachment constituting the present invention, generally designated 10, includes a blade 12 to which brackets 14 are rigidly affixed. The blade 12 is pivotally mounted on the conventional ripper-bar 16 of an earth-moving tractor 17 by attaching spaced apart, upstanding brackets 18 thereto and using a pin 20 to pivotally mount the bracket 14 therebetween. Pads or bearing plates 24 are rigidly affixed to the outer ends of the blade 12 and bear against the bar 16 when the blade 12 is in the position shown in FIGURE 1. The plates 24 maintain the blade 12 at a proper angle with respect to a vertical plane when the blade is used for backfilling or bulldozing.

A first set of projections 30 is rigidly affixed to the blade 12 and a second set of projections 32 is rigidly affixed to the ripper bar 16 in such a manner that they will engage each other when the blade is swung down into its operative position. A shear pin 34 may be employed to maintain the blade in its down position when the tractor is moving forward and the rippers are operating. The shear pin will break and release the blade when it comes in contact with an immovable object thereby preventing damage to the blade, but will maintain the blade in firm engagement with the soil being loosened by the ripper so that the ground the ripper is loosening will be leveled and graded.

When the blade 12 is used for bulldozing, the conventional hydraulic system 40 which operates and controls the depth of the ripper teeth may be used to hoist the blade 12 up and down.

The front-end loader 41 is a conventional bucket-type loader forming no part of the invention and will not be described in detail.

While the particular back-ripper attachment herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claim.

We claim:

In combination with the ripper bar of an earth-working tractor, a backfilling attachment comprising a blade, a hinge near each end of said blade, means attaching said hinges to said ripper bar, bearing plates rigidly affixed to opposed ends of said blade and bearing against said ripper bar to maintain said blade at an angle, interlacing projections affixed to said bar and said blade, pin receiving apertures in said projections and a shear pin engaged in said apertures.

References Cited in the file of this patent

UNITED STATES PATENTS

| 823,872 | Jones | June 19, 1906 |
| 2,986,828 | Lapins et al. | June 6, 1961 |

FOREIGN PATENTS

| 874,435 | France | May 4, 1942 |
| 1,096,835 | Germany | Jan. 5, 1961 |

OTHER REFERENCES

John Deere: Operator's Manual OM–U14270U, published July 1961.